United States Patent [19]
Welcome

[11] Patent Number: 5,477,634
[45] Date of Patent: Dec. 26, 1995

[54] BUOYANT GAME FISHING LURE

[76] Inventor: Lawrence M. Welcome, Box 365, Little Neck Rd., Cutchogue, N.Y. 11935

[21] Appl. No.: 285,048

[22] Filed: Aug. 3, 1994

[51] Int. Cl.⁶ .................................................. A01K 85/16
[52] U.S. Cl. ........................................ 43/42.48; D22/133
[58] Field of Search .................. 43/42.48, 42.45, 43/42.39, 42.36; D22/133

[56] References Cited

U.S. PATENT DOCUMENTS

| | | | |
|---|---|---|---|
| 1,093,980 | 4/1914 | Donaly | 43/42.48 |
| 2,036,946 | 4/1936 | Malecek | 43/42.48 |
| 2,315,247 | 3/1943 | Davenport | 43/42.48 |
| 2,497,473 | 2/1950 | Slepica | 43/42.48 |
| 2,590,990 | 4/1952 | McCormic | 43/42.48 |

*Primary Examiner*—P. Austin Bradley
*Assistant Examiner*—Jeanne M. Elpel
*Attorney, Agent, or Firm*—Galgano & Burke

[57] ABSTRACT

A buoyant fishing lure configured in the shape of a fish preyed upon by game fish and which, when tugged, exhibits simultaneously darting and diving actions. One or more weights positioned within the lure body provide a substantially, relatively even distribution of weight.

15 Claims, 3 Drawing Sheets

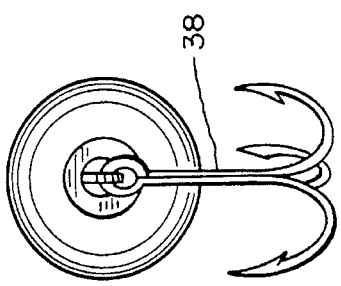
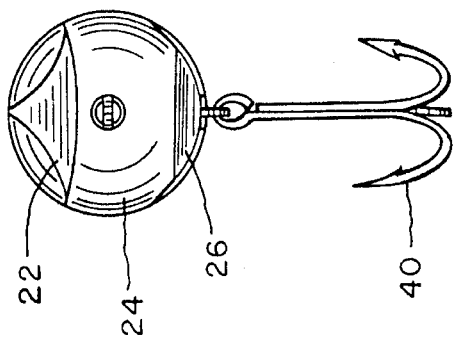
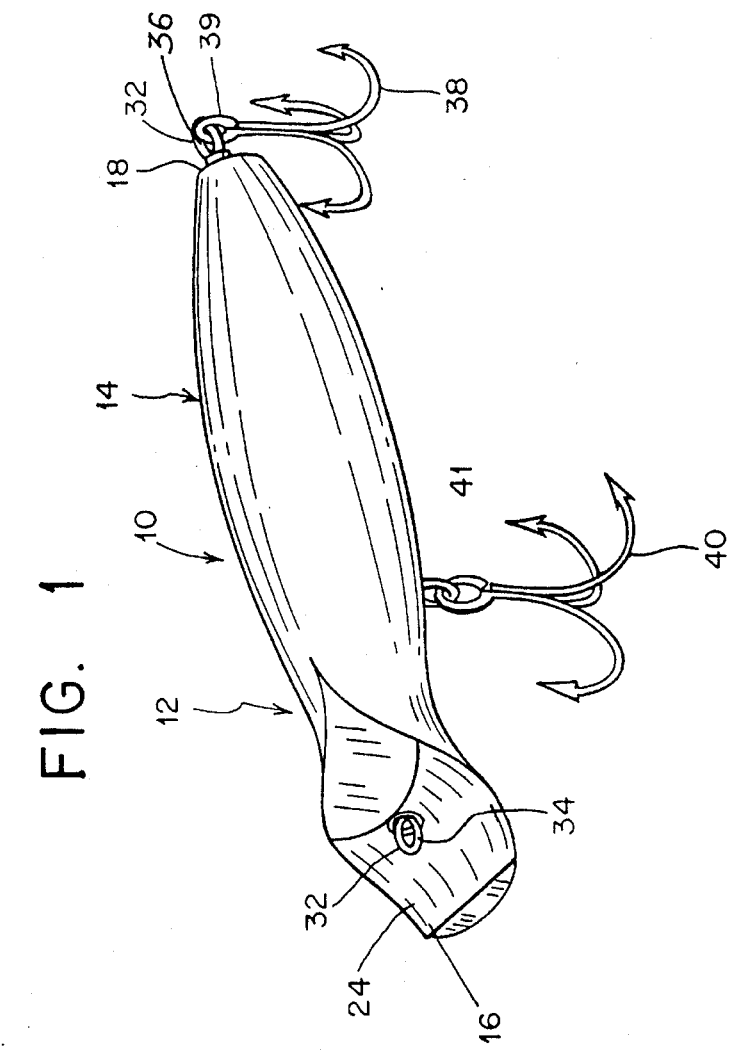

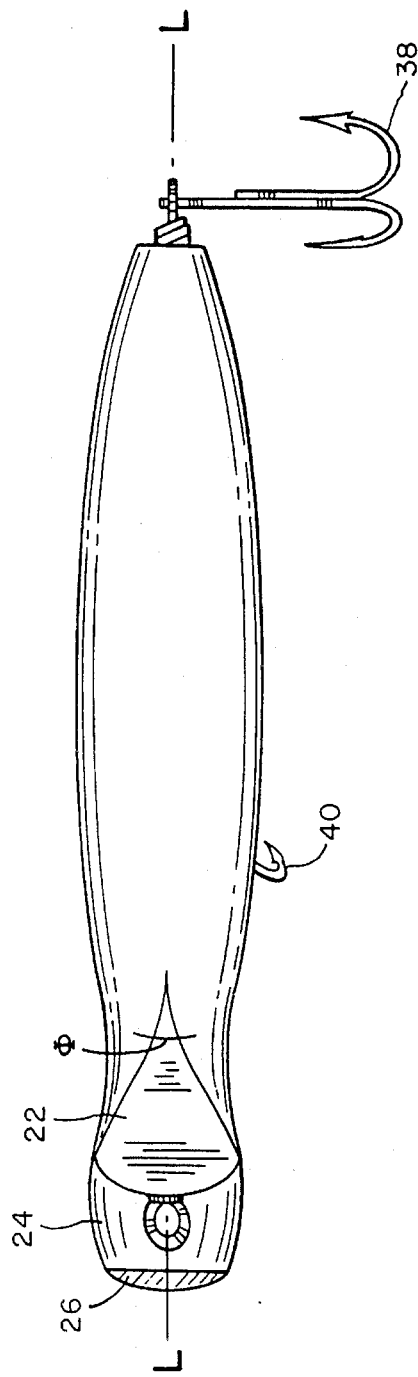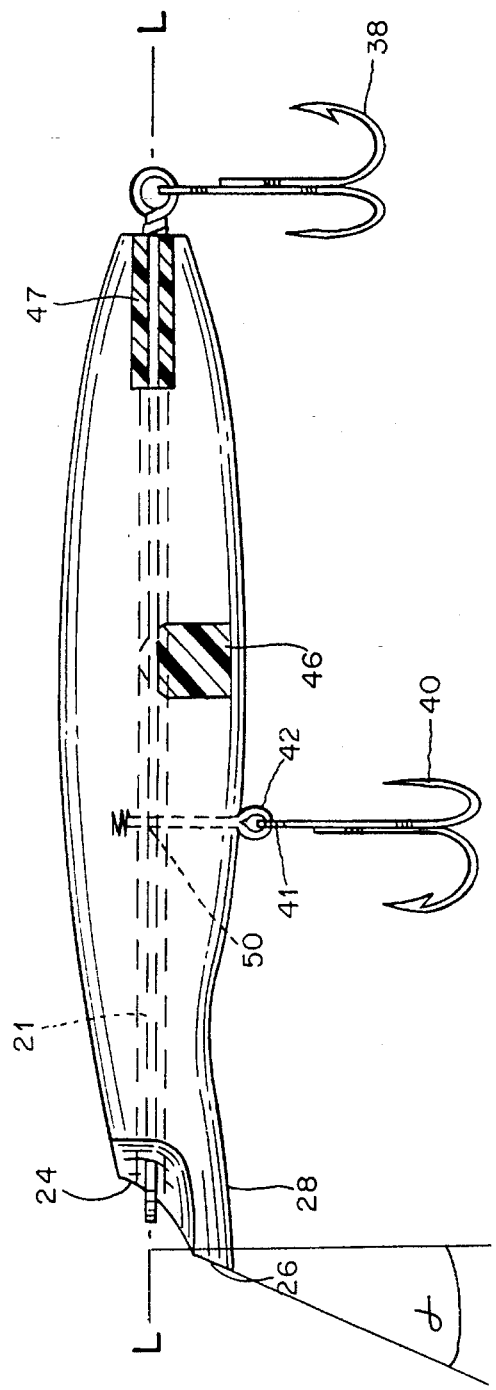

5,477,634

BUOYANT GAME FISHING LURE

BACKGROUND OF THE INVENTION

Game fish such as the striped bass and blue fish are attracted to and bite at a fishing lure based on factors including its size and shape. Game fish are also attracted to a lure based on its motion in the water when a fishing line attached to the lure is tugged. Fishing lures have been designed to mimic particularly the attractive movements of a game fish natural prey, e.g., the surface popping of a prey fish has been imitated by lures that create a significant splash when an attached fishing line is tugged. Other lures when tugged will move side to side in a darting motion and still others will dive and wiggle.

Efforts to impart these prey-mimicking actions to game fish lures have included multicomponent lure designs as illustrated in U.S. Pat. No. 4,959,920. However, multicomponent configurations suffer from disadvantages including complexity of manufacture and failure of component parts during use. Casting of these lures into the water can also be hindered by their shape, which can also limit the length of line casting or interfere with the intended direction of casting. Additionally, known lures are limited in their ability to replicate simultaneously a variety of prey fish actions when tugged. When tugged, they may either dive and wiggle or dart along the surface of the water but not simultaneously mimic each of these movements realistically, thereby lessening their appeal to a game fish.

Another disadvantage of known lures configured to mimic the movement of prey fish is that their designs do not ensure the secure fixation of fish hooks attached to the lure. Absent secure fixation, attached fish hooks may loosen or separate from the lure upon casting or when bitten.

It is therefore an object of the present invention to provide a game fish lure which closely replicates the shape and movement of a prey fish attractive to game fish, particularly those game fish indigenous to the northeastern United States. It is another object of the present invention to provide a prey fish-shaped lure which incorporates the advantages of both simplicity of design and close replication of natural prey fish movement. It is still another object of the present invention to provide a game fish lure which, when its appended fishing line is tugged, mimics simultaneously a number of attractive prey fish movements, including sideways darting, diving beneath the water surface, and wiggling, thereby having an enhanced appeal to game fish species such as the striped bass and bluefish. It is yet another object of the present invention to provide a game fish lure which both mimics simultaneously a number of prey fish movements and provides for secure fastening of attached fish hooks.

BRIEF DESCRIPTION OF THE DRAWINGS

FIG. 1 is a perspective view of a lure configured in accordance with a preferred embodiment of the present invention.

FIG. 2 is a top view of a lure configured in accordance with a preferred embodiment of the present invention.

FIG. 3 is a side view of the lure shown in FIG. 1 with portions shown in phantom.

FIG. 4 is a front view of the lure shown in FIG. 1.

FIG. 5 is a rear view of the lure shown in FIG. 1.

SUMMARY OF THE INVENTION

Figure 6:
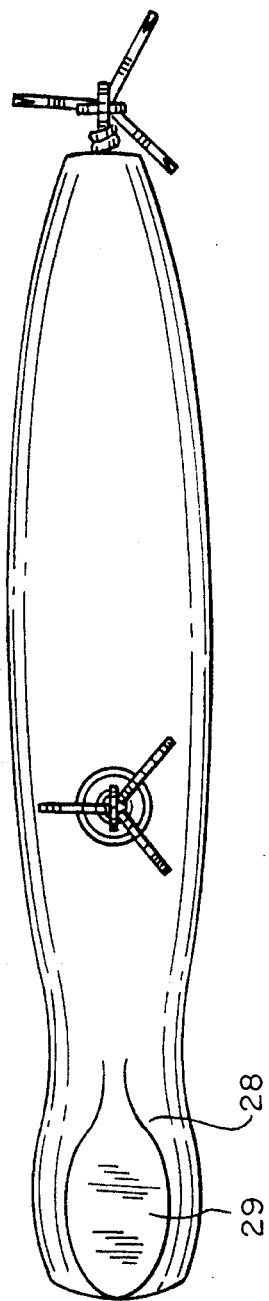
FIG. 6 is a bottom view of the lure shown in FIG. 1.

In accordance with the above-stated objects, a buoyant game fish lure is provided which, when an appended fishing line is tugged, exhibits simultaneously in the water a number of prey-mimicking actions including sideways darting, diving, and wiggling. The lure of the present invention has a body of varying circumference configured generally in the shape of a fish preyed upon by game fish, especially game fish indigenous to the northeastern United States such as the striped bass and blue fish.

This body configuration basically is defined by a head end and a tail end spaced at opposite ends along a longitudinal axis of the body. The head end is generally narrower in circumference than the middle or body portion and has a planar top section which slopes downwardly towards the longitudinal axis. This top portion of the head end viewed from an elevated perspective is configured essentially as a sector defined by an angle of ninety degrees or less. The top portion of the head end terminates above the longitudinal axis in a concave, dished lip which extends beneath the longitudinal axis. This lip has downwardly sloping arcuate edges which terminate in a downwardly sloping planar portion. The planar portion is positioned beneath the longitudinal axis and is essentially semicircular in configuration.

The bottom portion of the head end extends upwardly from this semicircular planar portion and consists in part of an approximately elliptically-shaped, planar segment. In turn, the bottom portion of the head end terminates at and is integral with the underside of the body. The tail end is formed by a lateral cross section of the body.

An aperture, preferably cylindrical in shape, extends through the body along the length of the longitudinal axis. A wire, preferably formed of stainless steel, extends through this aperture and is affixed at the head and tail ends by fastening means adaptable to a fishing hook and fishing line, e.g., a loop. Underside fastening means are positioned on the underside of the body, usually around its middle, and are secured to the wire by suitable radial fixation means, e.g., a barrel swivel. Fish hooks are attached to the underside fastening means and the tail end fastening means. A plurality of underside fastening means for the attachment of more than one underside fish hook can be provided in accordance with the instant invention. The number of hooks can vary with the size of the lure. For example a 1 or 2 oz. lure may be provided with two hooks while a 3 oz. lure may be provided with three hooks.

The simultaneous darting, diving, and wiggling actions exhibited by the lure of the present invention when tugged are facilitated by the body configuration just described, and by the inclusion of an underside weight in a cavity positioned within the body, beneath the longitudinal axis. This underside weight is placed at a location between the tail end and underside fastening means which results in the weight of the lure when buoyantly at rest in the water being distributed substantially evenly such that said lure rests substantially horizontally or with the head end dipped slightly lower than the tail end. Additionally, the configuration and weight distribution of the lure of the instant invention ensures that, when at rest in the water, the lure floats with the upper portion of its head end, including its downwardly sloping semicircular planar portion, even with or below the water surface and a substantial portion of its body, including that portion between the underside fastening means and tail end, is beneath the water surface. The weight distribution of the lure is designed to facilitate diving of the lure rather than causing the lure to plane across the top of the water surface. Because of its configuration, in particular the unique shape of its head portion, and its weight distribution, the lure of the instant invention will, when tugged, simultaneously dart in a zig-zag motion and dive beneath the water surface with its tail end exhibiting a wiggling action. By closely replicating these prey fish actions the lure of the instant invention exhibits an enhanced appeal to game fish which otherwise might not bite at or pursue a lure that moved less realistically.

Additionally, the lure of the instant invention provides for the secure fixation of attached fish hooks because of their joint connection to the longitudinal wire. Not only do the shape and weight distribution of the lure of the instant invention provide for highly realistic movement and secure hook fixation, but they also contribute to the superior length and accuracy of casting realized when the lure of the instant invention is used.

These and other features of the instant invention are illustrated in more detail in the following detailed description.

DETAILED DESCRIPTION

As illustrated in FIG. 1, body 10 of the buoyant lure of the instant invention varies in circumference depending on the desired length and weight, and is configured generally in the shape of a fish preyed upon by game fish such as bass or bluefish. The front portion 12 of body 10 is generally narrower in circumference than the middle portion 14. Body 10 terminates at a head end 16 and a tail end 18 which are at opposite ends of a longitudinal axis L. As best shown in FIGS. 2 and 3, an aperture 21, preferably cylindrical in shape, extends through the body 10 along the length of axis L. Tail end 18 is defined by a cross-section of rear portion 14. Body 10 can be manufactured from a variety of buoyant materials including various woods and thermoplastics. Preferred materials of manufacture include cedar, pine, bass, and balsa woods.

The upper portion 22 of front portion 12 slopes downwardly towards axis L and terminates in concavely dished lip 24. As illustrated in FIG. 2, viewed from an elevated perspective, upper portion 22 is configured essentially as a sector defined by an angle $\Phi$ of ninety degrees or less.

Referring to FIG. 3, lip 24 is intersected by axis L and has downwardly sloping arcuate edges terminating in a substantially semicircular and downwardly sloping planar portion 26. The bottom portion 28 of head end 16 extends upwardly from semicircular planar portion 26 and consists in part of an approximately elliptically-shaped, planar segment. FIG. 6 illustrates the location of this elliptical segment 29 relative to bottom portion 28. Bottom portion 28 terminates at and is integral with the underside of body 10. FIG. 3 illustrates the relationship of upper portion 22, lip 24, and planar portion 26 in one preferred embodiment of the instant invention.

Figure 7:
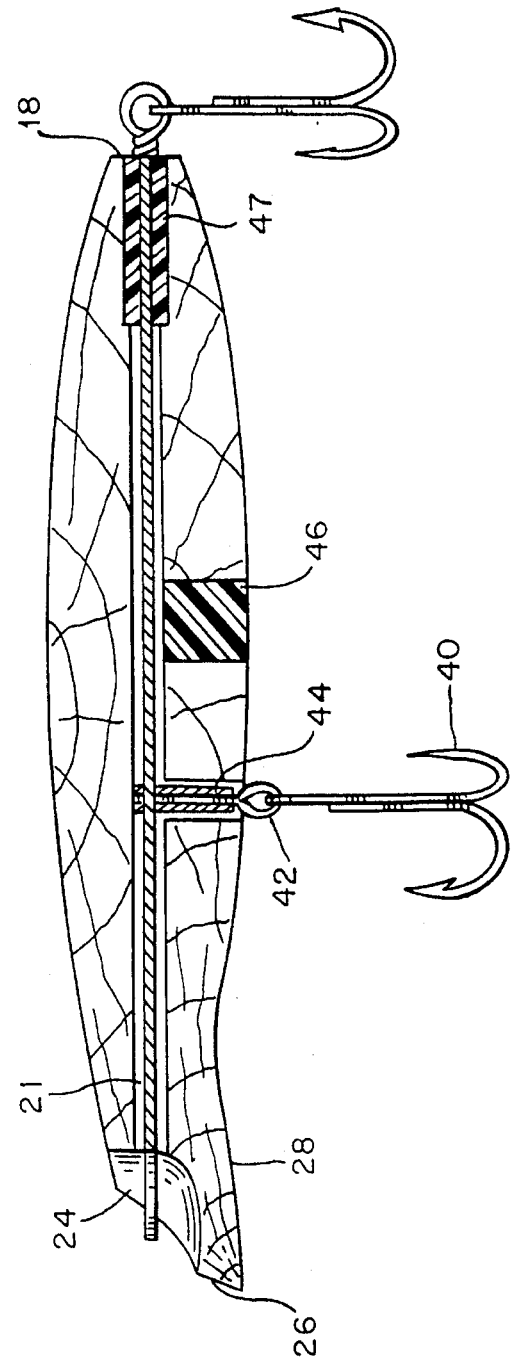
FIG. 7 is a cross-sectional side view of the lure shown in FIG. 1.

In the embodiment of the present invention illustrated in FIG. 1, a formed stainless steel wire 32 runs through aperture 21 from lip 24 to tail end 18 and is secured at those opposite ends by forming the wire 32 into loops 34 and 36. Tail end fish hook 38 is also attached to loop 36 by eye 39 and a fishing line may be secured to head end loop 34. As shown in FIGS. 3 and 7, eye 41 of underside fish hook 40 is attached to the lower loop 42 of a barrel swivel 44. Barrel swivel 44 extends radially and comprises a top loop 50 through which wire 32 extends. Securing loops 34, 36, and 44 to wire 32 lessens the chance that those loops will loosen or separate from body 10 when the lure is cast or when either of fish hooks 38 or 40 is bitten by a game fish. Wire 32 is preferably formed as a single integral element in order to provide sufficient tensile strength and also to provide the added benefit that if the body of the lure breaks or otherwise disintegrates during use, the fisherman will still have the fish securely attached to his line.

According to the illustrated preferred embodiment, a weight 46 is located within a cavity in the underside of body 10 and beneath axis L. Weight 46 may comprise any suitable materials, such as lead, and is positioned in a cavity position between barrel swivel 50 and tail end 18. A second, tail end weight 47 is positioned proximate tail end 18. The position of weights within the lures of the present invention is designed to ensure that the weight of the lure, when buoyantly at rest in the water, is distributed relatively evenly such that said lure rests substantially horizontally or with the head end dipped slightly lower than the tail end. The mass and size of any weight used with the fishing lures of the present invention may vary depending upon other design considerations such as the type of material used for the body, the mass of the hooks and the weight of wire 32. As an example, weight 47 may have a diameter of about ¼" and a length of about ¾" to 1½", while weight 46 at the tail end may have a diameter of about ¼", a length of ¾" to 1½" and a through hole for wire 32 having a diameter of about 0.05–0.075".

An embodiment of the lure of the instant invention was made from 1½" by 1½" rounded cedar stock. The center of the cedar stock was first determined and a 3/16", cylindrical aperture was drilled through the longitudinal axis. A variable speed metal working lathe, which included a lure-shaped template mounted on a duplicator attachment, was then used to shape the round stock. The unique configuration of the head portion was shaped by sanding. After provisions were taken to insure that the longitudinal aperture would be maintained, molten lead was poured into an aperture located between the underside and tail end holes and was allowed to solidify and cool. Primer, paint, and waterproof sealant were applied. A 10" long, 1/16" stainless steel wire was threaded through stainless steel eyelets in the head end hole and the top of a barrel swivel inserted into the underside hole. The wire was then threaded through and secured by knotting a loop at the rear end hole. Two 3/0 3x strong treble split loop hooks were then attached to the tail end loop and underside of barrel swivel.

According to one embodiment of the present invention, the upper portion of the head end is configured essentially as a sector defined by an angle $\Phi$ of about forty-five to seventy degrees, and the downwardly sloping, planar portion is oriented about an angle $\alpha$ of about twenty to twenty-five degrees from the perpendicular of a longitudinal axis extending through the body.

What is claimed is:

1. A fishing lure comprising:
  a body generally configured as a fish preyed upon by game fish,
  said body having a head end and a tail end spaced at opposite ends of a longitudinal axis extending through said body,
  said head end having a narrower circumference than a portion of said body and having an upper portion configured substantially as a sector defined by an angle of ninety degrees or less, said upper portion terminating above said axis in a concavely-dished lip, said lip having downwardly sloping arcuate edges extending beneath said axis and terminating in a downwardly sloping planar portion.

2. A fishing lure according to claim i wherein said downwardly sloping planar portion is configured substantially semicircularly and wherein said planar portion terminates in an upwardly sloping bottom portion integral with an underside of said body and defined in part by a substantially planar elliptical section.

3. A fishing lure according to claim 1, wherein said body defines an aperture extending the length of said axis;

said fish lure further comprising a wire extending through the length of said aperture and secured at said head end and tail end of said lure.

4. A fishing lure according to claim 3, further comprising means for fastening at least one fish hook to an underside of said lure, said fastening means secured to said wire; and a least one fish hook secured to said fastening means.

5. A fishing lure according to claim 4 further comprising an additional fish hook fastened to said wire proximate said tail end of said fish lure.

6. A fishing lure according to claim 4 wherein said underside fastening means comprises a barrel swivel.

7. A fishing lure according to claim 4 further comprising a weight located within a cavity in said body beneath said longitudinal axis at a position between said underside fastening means and said tail end, thereby distributing the weight of said lure, when said lure is buoyantly at rest in water, substantially evenly.

8. A fishing lure according to claim 3 wherein said wire comprises preformed stainless steel formed into loops proximate said tail end and head end.

9. A fishing lure according to claim 1 wherein said body is manufactured from materials selected from the group consisting of buoyant thermoplastics, cedar, pine, bass, and balsa woods.

10. A fishing lure according to claim 1 wherein, wherein the upper portion of said head end is configured essentially as a sector defined by an angle of about forty-five to seventy-five degrees.

11. A fishing lure according to claim 1 wherein the upper portion of said head end is configured essentially as a sector defined by an angle of about forty-five to seventy degrees, and said downwardly sloping, planar portion is oriented about twenty to twenty-five degrees from the perpendicular of said axis.

12. A fishing lure according to claim 1 comprising a plurality of underside fish hooks.

13. A fishing lure according to claim 12 wherein at least one of said fish hooks comprise a 3 X strong treble split loop hook having an eyelet.

14. A fishing lure comprising:

a body generally configured as a fish preyed upon by game fish, said body having a head end and a tail end spaced at opposite ends of a longitudinal axis extending through said body, said head end having a narrower circumference than a portion of said body and having an upper portion configured essentially as a sector defined by an angle of ninety degrees or less, said upper portion terminating above said axis in a concavely-dished lip, said lip having downwardly sloping arcuate edges extending beneath said axis and terminating in a downwardly sloping planar portion configured generally semicircularly, said planar portion terminating in an upwardly sloping bottom portion integral with an underside of said body, said body having an aperture extending the length of said axis;

a wire extending through the length of said aperture and formed at said head end and tail end into loops;

underside fastening means positioned on the underside of said body and secured to said wire;

at least one weight located within a cavity in said body, thereby distributing the weight of said lure when buoyantly at rest in the water relatively evenly; and fish hooks secured to said underside and tail end of said lure.

15. A fishing lure according to claim 14 wherein said weight is a lead weight cast into a cavity in the underside of said body.

* * * * *